Figure 1:
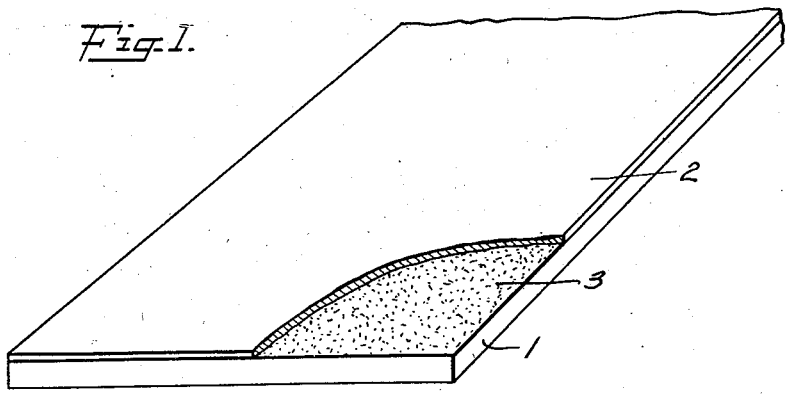

Nov. 22, 1927.

A. W. SCHORGER 1,649,983

VENEER CORE

Filed Dec. 20, 1924

INVENTOR
Arlie W. Schorger
BY
Pennie, Davis, Marvin & Edmonds
ATTORNEYS

Patented Nov. 22, 1927.

1,649,983

UNITED STATES PATENT OFFICE.

ARLIE WILLIAM SCHORGER, OF MADISON, WISCONSIN, ASSIGNOR, BY MESNE ASSIGNMENTS, TO C. F. BURGESS LABORATORIES, INC., OF DOVER, DELAWARE, A CORPORATION OF DELAWARE.

VENEER CORE.

Application filed December 20, 1924. Serial No. 757,296.

The present invention relates to the utilization of old tire casings. In most localities these casings are at the present time of low market value, and are commonly burned at the garages as soon as they are of no further value on automobiles. During the war, when the price of raw rubber was high, old tire casings were to some extent reworked for their rubber content. But at the present price of raw rubber, apparently a normal condition, the recovery cost, together with the relatively low quantity of the rubber recovered, makes it inadvisable to use tire casings as a source of raw material in the manufacture of high quality products, such as automobile tires.

I have discovered a simple and economical procedure by which veneer cores of a new kind and of excellent quality can be made from old automibile tire casings, as hereinafter pointed out more in detail.

According to my procedure, old tire casings, such as are to be found around any garage, are cut into strips about one-half inch wide, and fed through a shredder or disc mill of the kinds now commonly used in the paper industry for shredding bark, chipped wood, or cooked wood for paper pulp. These shredders tear up the strips of casing into small bits and in a large measure liberate the fibers of the casing fabric. At this stage of the operation, I find it economical to remove these fibers, even to the extent of what might be termed a very clean separation.

My principal reason for thus separating the fibers is that a very high quality of cotton is used in the fabric of tire casings, and this cotton, even after the shredding process, is still sufficiently long-fibred to be of value in the manufacture of paper products and the like.

The cotton fibre, when separated out, is particularly suitable for use in the manufacture of felt, such as is used in asphalt shingle making. Its use for that purpose is described and claimed in my co-pending application Serial No. 757,297, filed December 20, 1924.

The cotton fibres can be removed from the shredded mass by air separation, and the cotton thus recovered will, in large measure, pay for the cost of disintegration. However, for the manufacture of veneer cores, the fiber need not be removed, but can remain interspersed with the shredded rubber. It may have some value there as a binder, and in any event, it is not harmful.

The next step in the procedure consists in intimately grinding the shredded rubber with about one quarter of its weight of sulphur, inorganic and organic accelerators being added as desired, in conformity with usual rubber working practice. The material thus produced can then be vulcanized and shaped into a sheet or board in one of three different ways as follows:

First: The ground mixture may be pressed into a mold and held there at a temperature of around 145° C. until vulcanization is complete. This takes considerable time.

Second: Vulcanization may be effected by heating the mixture in the loose form in which it comes from the grinder, and subsequently regrinding, and then heating and pressing to the desired shape. At the proper temperature, the vulcanized or hard rubber becomes plastic and so can be pressed into a board or other desired shape.

Third: The ground mixture can be worked between heated rolls and can thus be rolled into sheets of the desired thickness, these sheets subsequently being vulcanized by heat in any suitable way.

A sheet of hardened rubber made as above described may be used as a veneer core for building operations, and in the manufacture of furniture. A layer of wood veneer, such for instance, as birch, may be affixed to one or to both faces of the core with casein glue or vegetable glue, and after being put through a humidity box and a dryer, as in ordinary veneer practice, yields a product wherein the wood surfaces show no tendency to pull away from the core. The drying may be carried out at a temperature considerably above room temperature.

One great advantage of a veneer of the type above described is that the core does not take up moisture, and hence, does not expand or contract.

Hard vulcanized rubber, as is well known, is practically unaffected by atmospheric conditions, and has a long life. The core above described is essentially hard rubber with or without a fibre filler.

Figure 2:
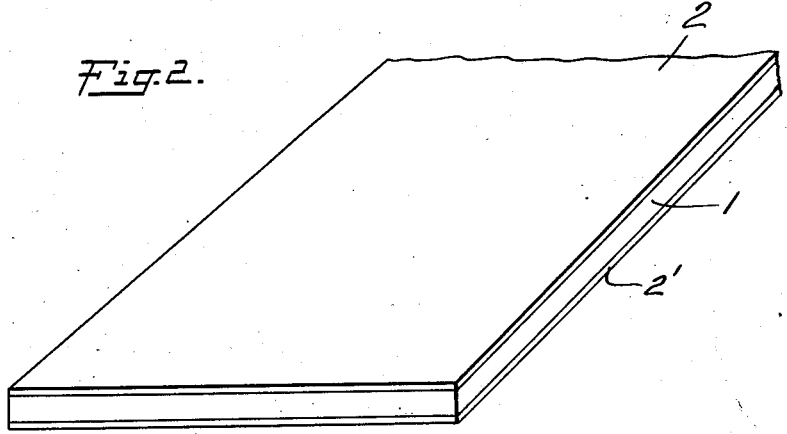

In the accompanying drawings I have illustrated several forms of the invention,

Fig. 1 is a perspective view of a core having a layer of wood veneer applied to one surface, parts being shown in section, and Fig. 2 is a similar view of a core having a layer of wood veneer applied to each surface.

Referring to the drawings, the reference numeral 1 designates the core of hard vulcanized rubber. This core may be formed any desired size, shape and thickness depending upon the use to which the finished board is to be put. A layer, 2, of wood veneer is arranged on the surface and secured thereto by an adhesive, 3, which may be casein glue or vegetable glue. The veneer layer is preferably comparatively thin as in the usual veneer practice and may be made of any suitable wood, such as birch.

In the form shown in Fig. 2 of the drawings, the under side of the core is also provided with a veneer layer, 2', which may be secured to the core in the same manner as the upper layer.

At first blush it might seem that such a material would be too expensive to compete with wood as a veneer core, either in building operations, or in the manufacture of furniture. My experience, however, has been to the contrary.

For the purpose of decreasing the weight, or the cost, or both, it is possible to add various fillers to the rubber previous to vulcanization. Wood flour, cork, lamp black, ground coke, and spent tan bark can be used in this way. I prefer to use cork, because I have found that the presence of waxes in the cork permits an intimate union or blending with the rubber. I have used with success a compound of which more than 50% by weight was ground cork. Higher percentages can be used if correspondingly higher pressures are used during the shaping operation. 5% by weight of ammonium sulfate can be added to the compound before it is shaped into its final form. This renders the material fire retardent.

In a companion application, Serial No. 757,258 filed December 20, 1924, claims are made on a molded product comprising rubber from old tire casings blended with cork and vulcanized. Claims are also there presented for the method of manufacture.

I claim:

1. A veneer board comprising a core of hard vulcanized rubber and a layer of wood secured directly to the surface of said core.

2. A veneer board comprising a core of hard vulcanized rubber and a layer of wood secured directly to the surface of said core by means of an adhesive.

In testimony whereof I affix my signature.

ARLIE WILLIAM SCHORGER.